May 3, 1966   P. C. DE LUCA ETAL   3,249,758
ELECTRO-OPTICAL TAPE SENSOR
Filed April 29, 1963   2 Sheets-Sheet 2

INVENTORS:
RICHARD H. DAVISON
PETER C. DE LUCA
STANLEY T. PARTEL, JR.

BY

ATTORNEY

United States Patent Office 3,249,758
Patented May 3, 1966

3,249,758
ELECTRO-OPTICAL TAPE SENSOR
Peter C. De Luca, Norwood, Stanley T. Partel, Jr., Brockton, and Richard H. Davison, Sudbury, Mass., assignors to Sylvania Electric Products Inc., a corporation of Delaware
Filed Apr. 29, 1963, Ser. No. 276,234
6 Claims. (Cl. 250—219)

This invention relates generally to web transport apparatus, and more particularly to an electro-optical sensing device for measuring of the volume of web material on a reel and/or for controlling the rate at which the material is wound on or removed from the reel.

The invention has application in various types of web transport systems, especially in tape transport systems where compactness, ruggedness, accuracy and reliable operation are essential, and will be described as applied in such a system. In a typical tape transport system, the tape is taken from a supply reel, passes around a guide roller and into a first tape well from which it is fed to the read/record head and then into a second tape well. From the second tape well the tape passes around a second guide roller and is fed to a take-up or storage reel. For proper operation of the tape handler it is desirable to know how much tape there is on the reels so as to have an indication of recording time remaining on the tape, and to enable control of the speed of the tape, to maintain a constant linear tape speed through the read/record head.

Heretofore, transducers, electro-mechanical devices and the like have been utilized to perform similar functions. For example, a device is described in an article entitled "Motor Control System Maintains Constant Reel Tension," Electrical Design News, October 1962, at page 62, wherein the amount of tape on a reel is sensed by an arm which lays against the tape on the reel, and is linked to a potentiometer in such a manner that variations in the volume of tape results in a corresponding variation in the resistance of the potentiometer. Devices of this type have the disadvantage of moving parts which are often complex both in operation and manufacture and they usually make physical contact with the material being sensed thereby causing it wear and damage. Electromechanical sensing systems are also subject to wear and damage from shock and vibration, and since they are bulky, they are not compatible with increasing requirements for miniaturization. Available sensing devices also have limited accuracy.

The primary object of this invention is to provide an accurate, compact apparatus for sensing the volume of material on a reel and/or for controlling the rate at which material is being wound or unwound on the reel.

Another object of this invention is to provide a sensing device which is relatively simple in construction and low in cost.

A further object of this invention is to provide a sensing device with no moving parts and which does not come in physical contact with the material being sensed.

Briefly, the invention resides in the recognition that the tape extending from a guide roller to a reel defines an angle with respect to a reference line drawn between the guide roller and the center of the reel which changes as the amount of tape on the reel changes. That is, when the reel is full, the angle between the tape and the reference line is relatively large, whereas this angle is appreciably smaller when the reel is nearly empty. In accordance with this invention, changes in this angle are measured to derive an indication of the volume of tape on the reel and an indication of the rate at which the tape is being wound on or unwound from the reel. To this end, an electro-optical sensing device consisting of a light source and a narrow slit aperture arranged to be exposed to the light source is positioned adjacent the tape, between the guide roller and the reel, with the aperture disposed substantially transverse to direction of movement of the tape. As the amount of tape on the reel changes, the point at which the moving tape intersects the aperture changes, blocking light from the source in proportion to the size of the angle between the tape and the aforementioned reference line. The device depends for its operation on the tape being opaque to the light from the source such that light reaches only that portion of the aperture not shielded by the tape. The amount of light reaching the aperture is thus a measure of the angle between the web material and the reference line, which, in turn, is proportional to the volume of tape on the real.

In a preferred embodiment, the slit aperture is defined by the end faces of a multiplicity of fiber-optic rods arranged in a suitable array. Each of the fiber-optic rods conducts the light incident thereon to a respective photocell displaced from the immediate area of the aperture. Since the fiber-optic rods have a small diameter, a large number of them may be placed in a relatively short array, and since each fiber-optic rod is coupled to a separate photocell, very good positional accuracy is attainable. Moreover, the compactness with which fiber-optic rods can be arranged permits placement of the sensor in a small volume, an important consideration where space is at a premium.

The foregoing and other objects, features and advantages of the invention, and a better understanding of its construction and operation, will become apparent from the following detailed description taken in conjunction with the accompanying drawings, in which.

Figure 1:
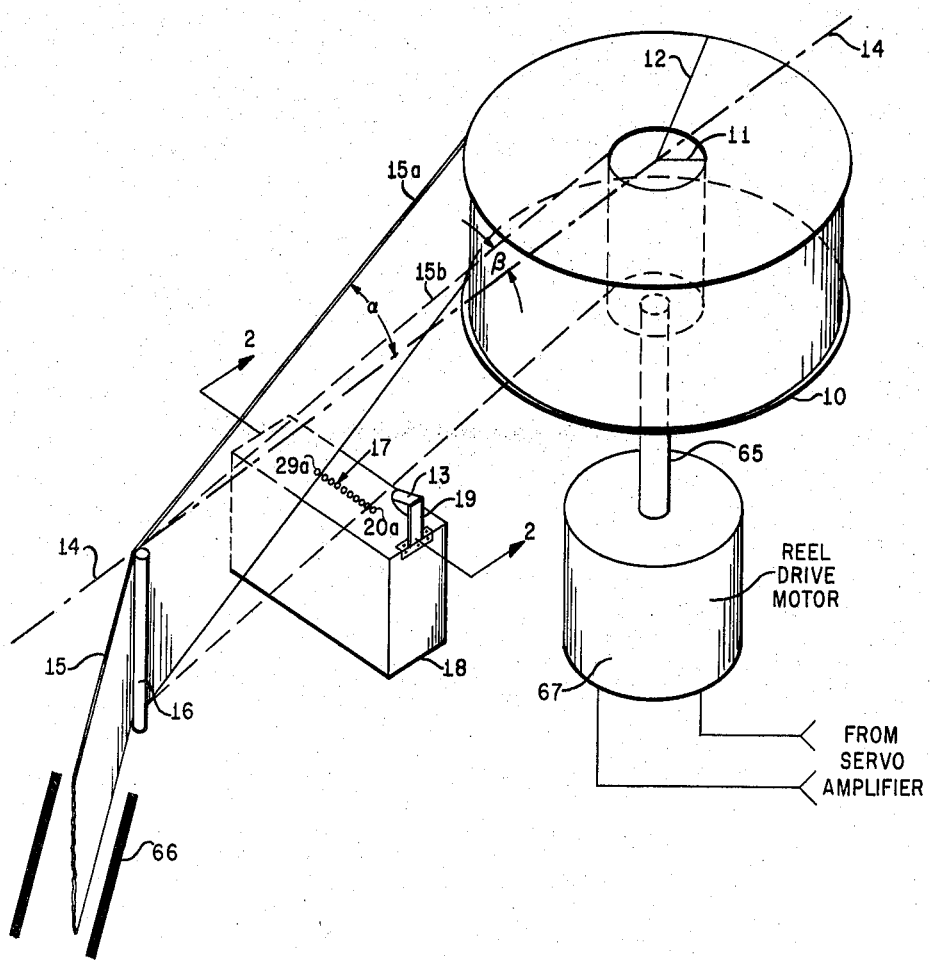
FIG. 1 is a diagrammatic view of a portion of a tape transport system illustrating the organization therewith of the present invention.

Referring now to FIG. 1, in a tape transport system of the type briefly described earlier, the tape 15 in entering or leaving the tape storage well 66 passes around a reference or guide roller 16 and thence to a supply or take-up reel 10. In such a tape transport the combination of supply reel with its associated guide roller and take-up well is essentially a mirror image of the take-up reel with its associated guide roller and take-up well, and the following description is equally applicable to either combination. In this configuration, the tape on a near empty reel has a minimum radius 11 of tape and the section of tape 15b between the reel and guide roller defines a minimum angle β with respect to the dot-dash reference line 14 drawn from the center of the reel to the reference roller. The tape on a full reel, on the other hand, has a maximum radius 12 and the angle α between the tape and reference line 14 is appreciably larger than β. In accordance with this invention, the angle between the tape and the reference line 14 is measured to thereby provide an indication of the volume of tape on the reel, which may in turn be used to control the reel drive motor 67 to maintain a constant linear velocity of the tape as it is being wound upon or unwound from the reel.

To detect the angle between the tape and the reference line, a sensing device 18 consisting essentially of a light source 13 and an aperture 17 formed by the end faces 20a through 29a of an array of fiber-optic rods 20 through 29, is positioned adjacent the tape between the guide roller and the reel such that the tape is perpendicular to the plane of the aperture 17 and also nearly perpendicular to a plane containing the light source and the aperture. Further, the sensing device is so positioned that the tape passes between the light source and aperture to thereby shield a portion of the aperture from the light. The extent to which the aperture is shielded is dependent upon the angle between the tape and reference line 14; thus, the amount of light incident upon the aperture is a measure of the angle.

Figure 2:
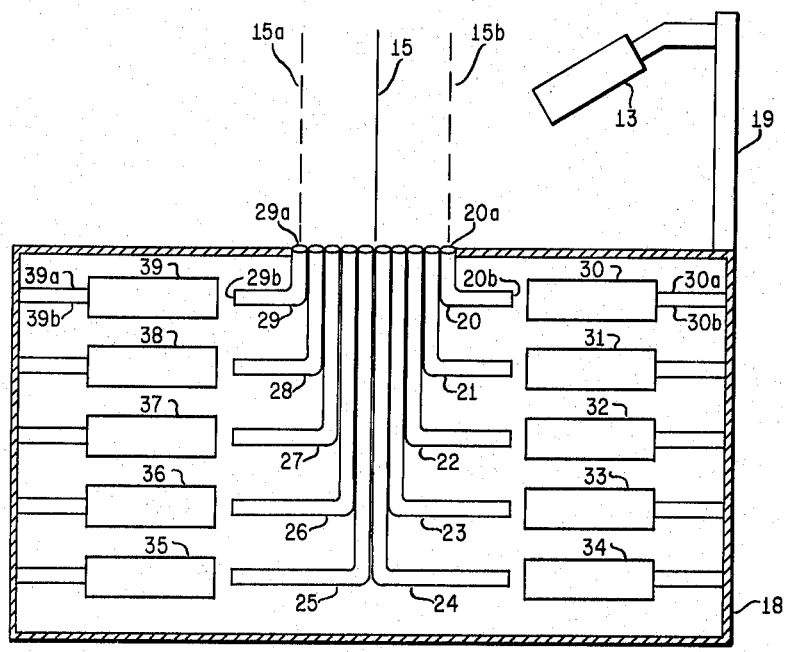
FIG. 2 is an elevation view of the electro-optical sensing device of the invention, taken along line 2—2 of FIG. 1.

To better understand the positioning and construction of the sensing device, reference is made to FIG. 2 which shows the fiber-optic rods 20 through 29 arranged with their respective ends 20a through 29a disposed in a common plane to form a narrow slit aperture 17. Beneath the plane of the aperture, the fiber-optic rods are bent so that their opposite end faces 20b through 29b confront respective photocells 30 through 39. Thus, each rod is capable of conducting light to one and only one photocell. For example, fiber-optic rod 20 conducts light to photocell 30, fiber-optic rod 21 conducts light to photocell 31, and so on. It will be apparent that the position of the tape 15 in passing between the light source 13 and the aperture 17 determines the portion of the aperture exposed to the light, which, in turn, determines which photocells are illuminated, and to what extent. As an example, when the tape is in position 15b, a minimum portion of the aperture is exposed to the light corresponding to a minimum angle β and a minimum radius 11 of tape on the reel. As the amount of tape on the reel increases the tape approaches position 15a corresponding to a maximum angle α and a maximum radius 12 of tape on the reel. In the disclosed embodiment the photocells are located relatively close to the slit aperture within the sensing device, but this is not a strict requirement. For instance, the photocells may be placed in a separate package at a distance from the sensing device with the fiber-optic rods arranged in a bundle and extending to the remotely positioned photo-cell package.

Figure 3:
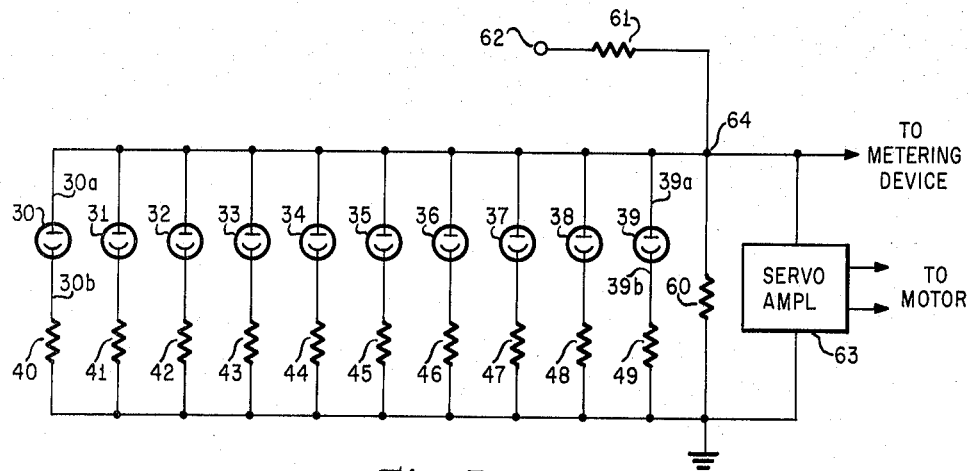
FIG. 3 is a circuit diagram of the photocells shown in block diagram form in FIG. 2 with associated circuit elements.

To illustrate the operation of the invention, reference is made to FIG. 3 which shows a preferred electrical circuit for use with the sensing device. The circuit utilizes a constant voltage source, represented by terminal 62, a voltage divider resistor 61, a reference resistor 60, a multiplicity of photocells 30 through 39, one for each fiber-optic rod, and a like multiplicity of resistors 40 through 49. Each photocell is connected in series with one and only one resistor, forming a multiplicity of series strings equal in number to the number of photocells. These series strings are connected in parallel with each other and in parallel with the reference resistor 60. This parallel-series circuit is connected in series with the dividing resistor 61 between voltage source 62 and electrical ground. Point 64, at the junction of resistors 60 and 61, is connected to a suitable metering device and/or to a servo amplifier 63 to control the drive of the reel motor 67 shown in FIG. 1.

In operation, when no photocells are exposed to the light source by reason of the tape shielding the entire aperture, the resistance of the photocells is a maximum and the resistance of the parallel combination of series strings with the reference resistor 60 is likewise a maximum. As a result, the voltage signal to the metering device and to the servo amplifier is at its maximum amplitude. As the amount of tape on the reel increases to expose more of the aperture, and thereby illuminate more of the photocells, the resistance of each exposed photocell decreases proportionately; thus, the resistance of the series-parallel combination also decreases to cause a decrease in amplitude of the voltage applied to the metering device and/or the servo amplifier. By judicious selection of resistors 40 through 49, the amplitude of the signal to the metering device and to the servo amplifier is a function of the angle between the tape and reference line 14. This angle being a measure of the volume of tape on the reel, the metering device indicates the amount of tape upon the reel. When applied to a servo amplifier, the output of the sensing device may be used to control motor 67 in a manner to maintain constant the linear velocity of the tape as it is wound upon the reel.

In a typical example of a tape transport of the kind shown in FIG. 1, the spindle of reel 10 has a radius 11 of one and three-fourths inches and an outer radius 12 of three and three-fourths inches. The axis of the reel is six inches from the guide roller 16 as measured along reference line 14. To a good approximation the tape between the reel and the guide roller is tangent to the tape already on the reel and forms one side of a right triangle of which reference line 14 is the hypotenuse and the radius of the tape on the reel to the point of tangency of the tape is the base. For a near empty reel of the above dimensions, angle β is approximately seventeen degrees, and for a near full reel angle α is approximately thirty-nine degrees. That is, the tape sweeps out an angle of approximately twenty-two degrees as the volume of tape on the reel increases from empty to full. Using a slit aperture six-tenths of an inch long, the previously described sensing function is accomplished by placing the center of the aperture one and four-tenths inches from the guide roller, and approximately sixty-six hundredths of an inch from reference line 14, as measured along a line from the center of the aperture perpendicular to the reference line. It will be evident that an aperture of the indicated length can be formed of ten fiber-optic rods, each having a diameter of six hundredths of an inch, arranged side by side in a linear array.

While the invention has been described and the novel features pointed out as applied to a preferred embodiment in a particular application, it will be understood that various omissions and substitutions and different applications may be made by those skilled in the art without departing from the spirit of the invention. For example, instead of using a multiplicity of fiber-optic rods and a like multiplicity of photocells, all of the fiber-optic rods may be coupled to a single photocell, and changes in photocell signal measured as more or less rods are illuminated. Or, the aperture may be merely a narrow slit beneath which is placed a collecting lens which directs all the light passing the slit to a single photocell or some other light sensing element. Besides being useful in a tape transport system, the invention has applications in the packaging of any web materials which are wound on rolls. It is applicant's intention, therefore, to be limited only as indicated by the scope of the appended claims.

What is claimed is:

1. In a system for transporting opaque tape between a reel and a reference roller disposed parallel to the axis of said reel and wherein the angle defined by the tape extending between said roller and said reel and a reference line drawn from said roller to the axis of said reel varies in accordance with the volume of tape on said reel, said angle being of minimum and maximum values when said reel is empty and full, respectively, apparatus for continuously measuring the amount of tape on said reel comprising, a light sensing device including an elongated aperture disposed adjacent one edge of said tape and substantially transverse to the path of travel thereof in a plane generally perpendicular to the plane of said tape, the dimension of said aperture from one end to the other being substantially coextensive with the range of positions of said tape, at the intersection of said tape with said aperture, from a position near said one end of the aperture at which said angle is a minimum to a position near said other end of the aperture at which said angle is a maximum, a light source positioned on one side of said tape and arranged to direct light transversely of said path of travel toward said aperture whereby the amount of light incident upon said aperture is dependent upon the position of the point of intersection of the tape with the aperture, and means for deriving an electrical signal having a magnitude proportional to the amount of light incident on said aperture.

2. Apparatus in accordance with claim 1 wherein said light source is positioned nearest said one end of said aperture thereby causing a signal of minimum amplitude for the minimum value of said angle.

3. Apparatus in accordance with claim 1 wherein said aperture is formed by the end faces of a plurality of fiber-optic rods and further including at least one photocell for producing an electrical signal of a magnitude proportional to the number of fiber-optic rods illuminated by said light source.

4. Apparatus in accordance with claim 1 wherein said aperture is formed by an array of end faces of a plurality of fiber-optic rods disposed in a common plane, and further including a like plurality of photo-cells coupled to the other end of respective ones of said fiber-optic rods, and circuit means including said photo-cells for producing an electrical signal of a magnitude proportional to the portion of said aperture illuminated by said light source.

5. In a system for transporting opaque web material between a reel and a roller and wherein the angle defined by the flight of web material extending between said reel and said roller and a reference line drawn from said roller to the axis of said reel varies with the amount of web material on said reel from a minimum value when said reel is empty to a maximum value when said reel is full, apparatus for continuously measuring the amount of web material on said reel comprising, light sensing means including an aperture disposed adjacent one edge of said web material, said aperture having a major dimension substantially transverse to the path of travel of said web material and lying in a plane generally perpendicular to the plane of said web material, said major dimension of said aperture being substantially coextensive with the range of positions of said web material with variations in said angle between its minimum and maximum values at the intersection of said web material with said aperture, a light source positioned on one side of said web material and arranged to direct light transversely of said path of travel toward said aperture, and means for deriving an electrical signal having a magnitude proportional to the amount of light incident on said aperture.

6. In a system for transporting opaque web material between a reel and a roller and wherein the angle defined by the flight of web material extending between said reel and said roller and a reference line drawn from said roller to the axis of said reel varies with the amount of web material on said reel from a minimum value when said reel is empty to a maximum value when said reel is full, apparatus for continuously measuring the amount of web material on said reel comprising, light sensing means including an elongated aperture, said light sensing means being positioned between said reel and said roller with the long axis of said aperture disposed adjacent one edge of said web material and in substantially orthogonal relation therewith, the long axis of said aperture being substantially coextensive with the range of positions of said web material with variations in said angle between its minimum and maximum values, and a light source positioned on one side of said web material and arranged to direct light toward said aperture whereby the amount of light incident upon said aperture is dependent upon the size of said angle.

References Cited by the Examiner

UNITED STATES PATENTS

| 2,561,508 | 7/1951 | Gregorie et al. | 250—227 X |
| 2,926,860 | 3/1960 | Pomarico | 250—219 X |
| 2,960,611 | 11/1960 | Namenyi-Katz | 250—222 |
| 3,002,283 | 10/1961 | Quinn et al. | 250—227 X |

FOREIGN PATENTS 1,040,261  10/1958  Germany.

RALPH G. NILSON, *Primary Examiner.*

E. STRICKLAND, J. D. WALL, *Assistant Examiners.*